May 14, 1963   B. FINGEROOT ETAL   3,089,204
WINDSHIELD WASHER APPARATUS FOR VEHICLES
Filed Nov. 30, 1961   2 Sheets-Sheet 1
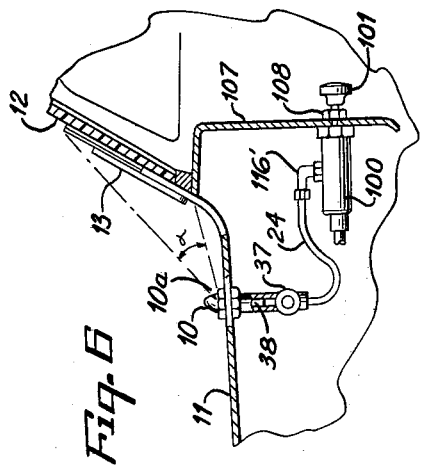
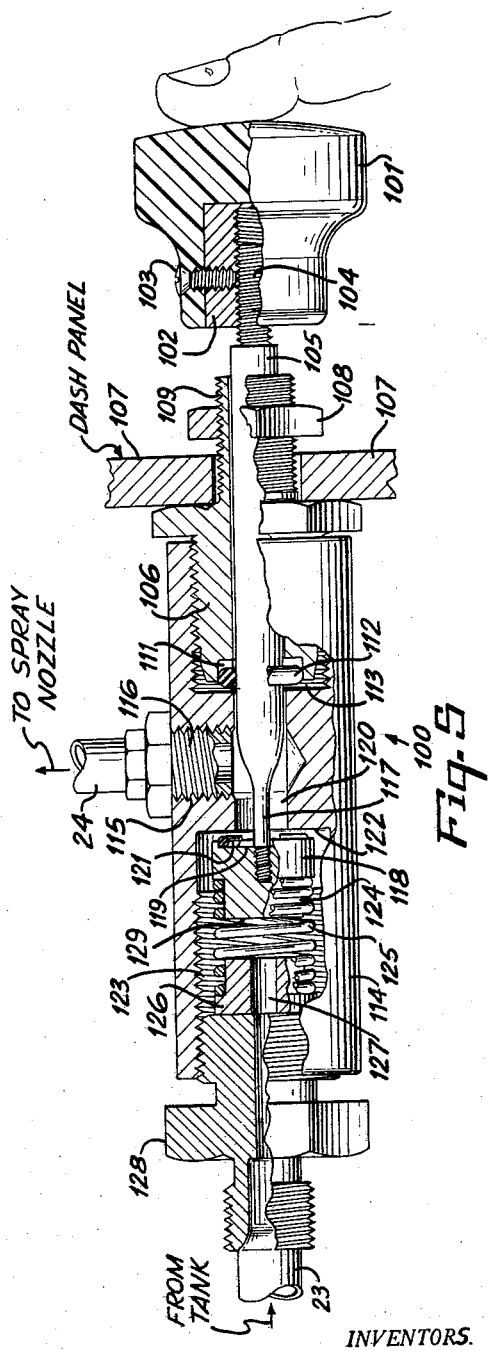
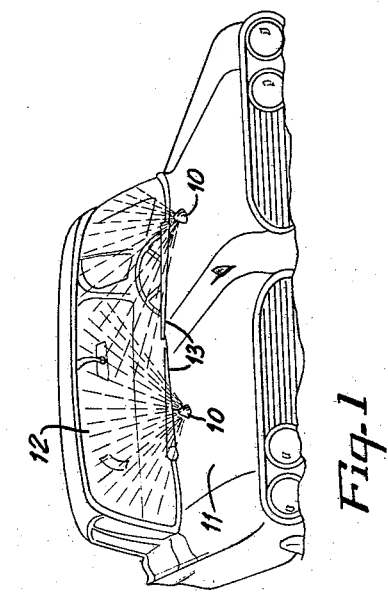
INVENTORS.
BEN FINGEROOT
MARION ALBERT ELLIOTTE,
(DECEASED) BY TED J. LEON, ADMINISTRATOR
ATTORNEY May 14, 1963 B. FINGEROOT ETAL 3,089,204
WINDSHIELD WASHER APPARATUS FOR VEHICLES
Filed Nov. 30, 1961 2 Sheets-Sheet 2

INVENTORS.
BEN FINGEROOT
MARION ALBERT ELLIOTTE,
(DECEASED) BY TED J. LEON, ADMINISTRATOR
BY
ATTORNEY

United States Patent Office 3,089,204
Patented May 14, 1963

3,089,204
WINDSHIELD WASHER APPARATUS FOR VEHICLES
Ben Fingeroot, Oakland County, Mich., and Marion Albert Elliotte, deceased, late of Oakland County, Mich., by Ted J. Leon, administrator, Dallas County, Tex.; said Leon assignor to said Fingeroot
Filed Nov. 30, 1961, Ser. No. 156,175
3 Claims. (Cl. 20—40.5)

The present invention relates to a windshield washer for automotive vehicles, and more particularly to a compressed-air operated spray device controllable from the instrument panel of the vehicle for removing dirt and ice from the windshield, and which is not dependent upon the vehicle engine for operating pressure.

Windshield washers are known which produce a squirting jet or stream of water of relatively short duration direction onto the windshield wherein the pressure for producing the jet is derived from the vehicle engine or from a compressible bulb or hand-operated piston. In these devices the water jet or stream is directed into the path of a reciprocating rubber wiper blade for the purpose of moistening and wiping clean the windshield. However, such known devices have numerous disadvantages and are ineffective under many driving conditions.

These known devices usually require that the vehicle engine be running before pressure is supplied to force the stream of water onto the windshield. Furthermore, such devices are ineffective to rapidly clean off mud which may be splashed onto the windshield. Instead, what often happens on a wet or muddy road, for example, when a passing heavy truck and trailer with numerous large wheels bespatters the windshield with a sudden volume of mud, the rubber wiper blade merely serves to knock off or sweep away and thus waste most of the water from the brief jet stream without adequately distributing it, leaving the windshield with insufficient water to rinse off the mud. The reciprocating rubber wiper blade then merely spreads the remaining grit and mud across the driver's line of vision. This condition is aggravated at night when the lights of oncoming vehicles are reflected from the muddy windshield, and brings about a dangerous driving condition, especially when the bespattering of the windshield takes place at night and while the vehicle is traveling at high speed. Furthermore, the grit and mud spreading over the relatively dry windshield has a wearing effect on the wiper blades. These blades are often left unreplaced, though worn, and aggravate the formation of streaks on the windshield, thus further increasing the driving hazard.

Another disadvantage of commonly known types of windshield washers is the difficulty in properly adjusting them. The nozzles which direct the jet stream are normally adjusted while the vehicle is at rest so that they direct the jet stream to impinge upon a point on the windshield in the center of the oscillating path of a respective wiper blade. However this adjustment often is improper for operation of the washer while the vehicle is travelling, because the jet stream is not only deviated by wind and air currents, but the relatively low pressure of the jet stream, and consequently its point of impact, varies with varying driving conditions and changes in engine speeds. Furthermore, even when properly directed, the jet stream has only a limited area of contact with the windshield, relying on the wiper blade for distribution. As a result, only the area of the windshield traversed by the slightly moistened rubber wiper blade can be cleaned, while the windshield outside of this wiper-traversed area remains unwashed and even becomes more and more bespattered with mud and dirt droplets swished aside by the reciprocating wiper blade. Moreover, since the major portion of the jet stream, which is of relatively short duration, is quickly diverted by the reciprocating wiper blade from this limited contact area, the liquid reservoir in these known devices soon becomes depleted.

Another disadvantage of the known windshield washers is that in freezing weather, when the windshield and wiper blades may be encrusted with ice and snow, the device will not operate effectively until the snow has been manually brushed away, the sleet or ice scraped from the windshield, and the jet nozzle outlet opening sufficiently thawed. Only then can any liquid, such as de-icing fluid, be squirted from these known windshield washers onto the windshield by the limited pressure derived from the engine.

Furthermore, in these known devices, the jet stream dies down and off to terminate each squirt, and the frequency of the number of squirts or the duration of each squirt cannot be controlled by the driver.

It is therefore an object of the present invention to provide a windshield spraying device which overcomes the above-mentioned difficulties.

It is a further object of the invention to provide a more effective and efficient windshield washer device for producing a fine spray of liquid for washing, cleaning or de-icing windshields of trucks, buses, and cars, and which is durable and reliably operable in all kinds of weather and under severe operating conditions, regardless of whether the vehicle engine is operating.

It is another object of the invention to provide a windshield washer device capable of producing a fog spray or mist of liquid and operable by a push of the operator's thumb at the instrument panel of the vehicle for controlling the duration and frequency of the number of fog spray mists applied to the windshield.

It is another object of the invention to provide a pressure-type spray device which is readily and conveniently refillable at customary automobile gasoline service stations with fluid and with compressed air to power it, with a maximum of safety and requiring a minimum of maintenance or tools.

A further object of the invention is to provide a compact device which can spray and distributes a fog or mist of liquid droplets over substantially the entire area of a vehicle windshield and capable of being operated five hundred times or more without requiring refilling with air or liquid.

Briefly, the invention comprises a sealed tank mounted under the engine hood or other suitable location of the vehicle and adapted to be partially filled with water, glass-cleaning fluid or de-icing liquid. The balance of the tank is then filled with compressed air through an air inlet valve. Novel safety devices are provided to limit the level of liquid and to safely relieve the pressure in the tank when the filler-plug is removed, to prevent injury to personnel. A pair of spray nozzles connected through a novel control valve to the tank are arranged on top of the vehicle hood to direct a fine spray onto the windshield so as to cover substantially the entire windshield area with droplets of the liquid. The control valve comprises a push-button device mounted on the instrument panel to control the spray for as long or as short a period and as often as the operator desires and cooperates with the nozzles so as to spray a mist and deposit liquid droplets across not only the entire contact area traversed by the wiper blades, but also to repeatedly cover the balance of the windshield with clean liquid droplets.

Further objects, features and advantages of the invention will become more apparent from the following detailed description and the accompanying drawing, in which:

FIG. 1 is a perspective view showing the arrangement of the spray nozzles relative to the windshield and wiper blade path;

FIG. 5 is another detail of the device of FIG. 2, showing the control valve in open position, with a push button operable from the instrument panel; and FIG. 6 is a partial cross-section of the vehicle of FIG. 1, showing in side view the spray nozzle and its angular relation to the windshield area covered thereby.

Figure 2:
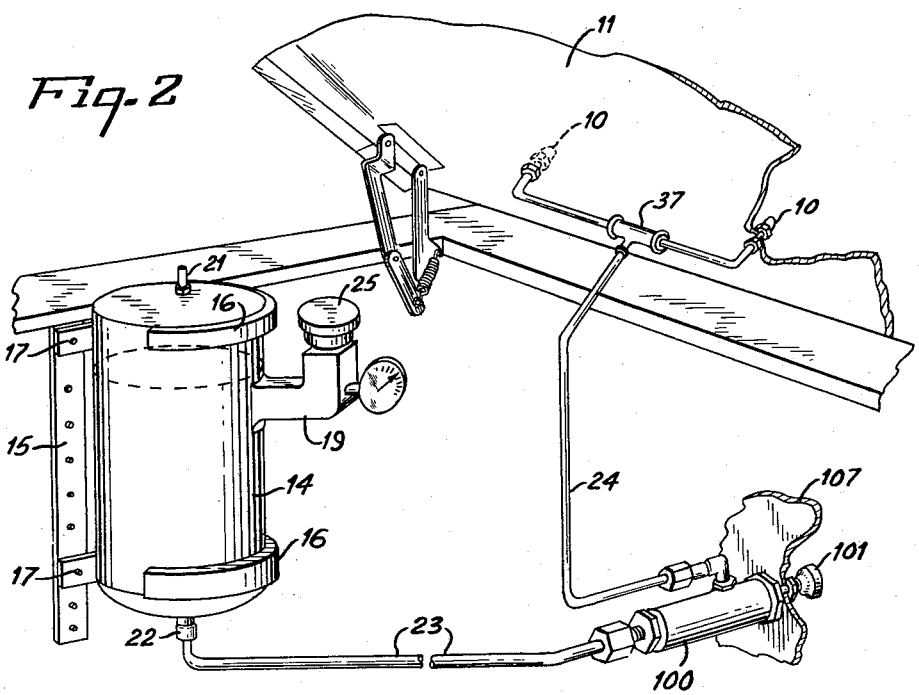
FIG. 2 is a perspective view showing the general arrangement of the apparatus according to the invention.

As shown in FIGS. 1 and 6, a pair of nozzles 10, 10 are secured to the forward hood 11 of a motor vehicle. Each nozzle is formed with a notch 10a directed in such a manner that a fog or spray mist is produced which deposits fine droplets of a cleaning fluid over the entire area of the windshield 12, including the area traversed by the reciprocating wiper blades 13.

As best illustrated in FIG. 2, the cleaning liquid is supplied to the nozzles 10 from a source comprising a pressure tank 14 mounted under the forward hood 11, for example on the inner fender wall, dash board or other suitable location of the vehicle, by means of a vehicle mounting brackets 15 and metal straps 16 which encircle the tank 14. The tank 14 is adapted to contain in its lower portion the cleaning fluid, which may be composed of water, a solvent or detergent-type cleaning solution, or a de-icing fluid, such as glycerine, alcohol or diethylene glycol. A special fitting 19 is fixedly attached to the side of tank 14 for the introduction of the liquid into the tank, and has means for measuring the tank pressure, for automatically gradually releasing the pressure from the tank pressure, for automatically gradually releasing the pressure from the tank prior to filling with liquid and, in the modification of FIG. 4, for also introducing compressed air into the tank 14. The various component parts of fitting 19 will be described in further detail below.

Compressed air is introduced into the upper portion of tank 14 through a spring type valve 21, 21', further described below. This filling with both air and liquid may be done at any ordinary automotive gasoline service station, the air being supplied from a conventional air-compressor hose (not shown) such as is commonly used for filling pneumatic tires. The compressed air is stored in the upper portion of tank 14, over the level of the cleaning liquid, to supply the necessary pressure to force the cleaning liquid out from the bottom of the tank through an outlet fitting 22, through a duct 23 and control valve 100, then through a flexible duct 24, and out through the nozzles 10, onto the windshield.

The fitting 19 (FIG. 3) is provided with a threaded removable filler plug or cap 25 screwed by means of mutually engageable threads or coupling means into the upper part of the fitting. Plug 25 has a flexible O-ring 26 fitting partly into an annular groove 27 of cap 25 and forming a seal between the upper surface 28 of the fitting 19 and the filler cap. A central bore 29 with a branching side outlet vent 30 is formed in the cap 25 and serves to release pressure to the side through outlet 30 when the cap 25 is unscrewed from fitting 19 sufficiently to raise the O-ring 26 from the surface 28. This prevents a sudden release of pressure or flying up of the loosened cap, which could otherwise cause injury to personnel leaning over the top of the opening of fitting 19 to fill it. The location of the surface 28 of fitting 19 determines the uppermost level of liquid to which the tank 14 can be filled without overflowing.

A pressure guage 31 may be provided in the fitting 19, preferably located at a point below surface 28, so that it will normally indicate the pressure of the liquid in the tank 14. However, the gauge 31 may also be connected so as to communicate with the air space 36 in the upper portion of tank 14, and thus always indicate the pressure of the air over the liquid. The pressure gauge 31 may also contain a known type pressure-release pop-off valve (not shown) adapted to release air or liquid from the tank when a predetermined pressure is exceeded.

Figure 3:
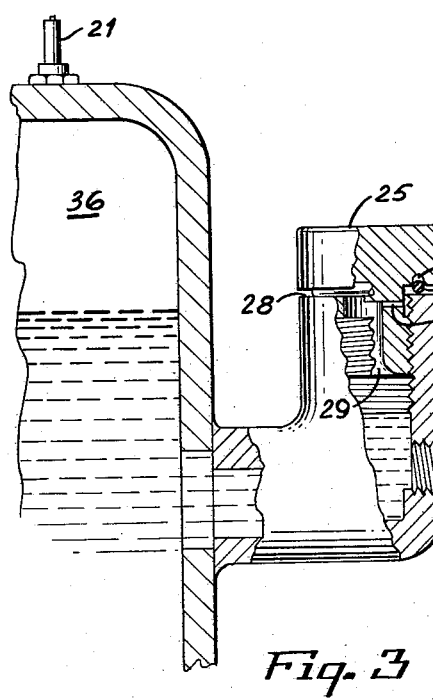
FIG. 3 is a detail of the device of FIG. 2, showing in partial cross-section the tank, filler plug and overflow fitting.
Figure 4:
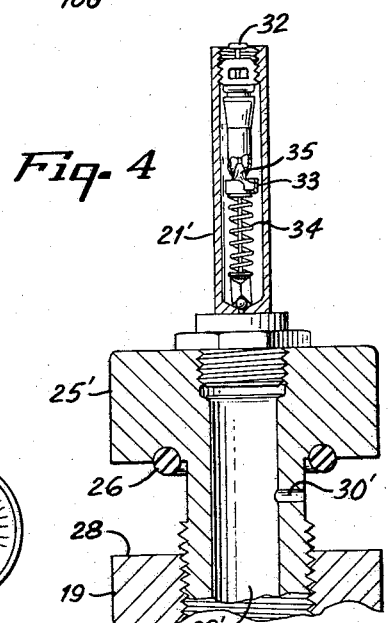
FIG. 4 is an enlarged detail in cross-section of a modification of the device of FIG. 3.

FIG. 4 shows another type filler cap 25' which is a modification of that shown in FIG. 3, and illustrated in a partly unscrewed position, for the pressure within the tank to be released through the central bore 29' and side vent 30'. In this modification, the bore 29' is coextensive with the height of the cap 25', and an air inlet valve 21' is fixedly attached at the upper extremity of bore 29', so that air entering through the air valve 21' passes through the bore 29' into the fitting 19, bubbling down through any liquid in the fitting, and passing through the tank 14 up into the air space 36 in the upper portion of the tank.

The air valve 21, 21', shown in cross-section in FIG. 4, operates in a manner similar to valves commonly used in pneumatic tires, and comprises a center pin 32 to which is fixed a collar 33 having a rubber insert and which is biased upwardly by a compression spring 34 against a sleeve 35 to form the seal. When pin 32 is pushed down in opposition to the spring 34, collar 33 moves downwardly away from sleeve 35 and thus opens the valve passage for either inlet or exhaust of air, depending upon which side of the valve is at a higher pressure.

The tank 14 is pressure-tight and of a size in accordance with the requirements of the vehicle. For most applications a five quart volume tank is sufficient, adapted to carry a maximum of about three quarts of liquid in its lower portion, the remaining space to be filled with compressed air at a pressure up to about 70 p.s.i. Surprisingly, a tank of these dimensions and containing air at initially 70 lbs. per square inch pressure will supply, through the nozzles, 500 or more washings or spray applications of one of two seconds duration each. This unexpected result is due to the fact that the spray mist is widely distributed in fine droplets, as shown in FIGS. 1 and 6, and thus the liquid is not wasted by having most of its volume shunted or swept away by the reciprocating wiper blades 13, as in prior-art devices in which the water is supplied to a small area in the wiper-blade path.

The main duct 23 leading from the tank 14 to the control valve 100 is preferably made of copper tubing, with soldered or standard brass tubing-fitting connections, to insure durability and pressure-tightness. However, the duct 24 must be flexible to allow for opening and closing of the engine hood 11. For this purpose, flexible nylon type tubing provided with brass pressure-tight end connections and a T 37 is preferred and is better than rubber tubing for durability and pressure-tightness at the relatively high pressures invloved.

The push-button control valve 100, shown in open position and in partial cross-section in FIG. 5, is adapted to be fastened to the instrument panel 107 of the vehicle. A plastic push knob 101 with a metal insert 102 is mounted on the threaded end portion 104 of a control rod 105 and fixed into position by a set screw 103 so that finger pressure on the knob will slide the rod 105 axially toward the left (as viewed in FIG. 5) relative to its tubular valve housing 114, and against the force of a compression spring 125, augmented by the pressure from tank 14 acting through tube 23 and tending to force rod 105 to the right. A threaded fitting 106 is provided for attaching the tubular valve housing 114 to the instrument panel 107 of the vehicle, to which the valve 100 is secured by a threaded nut 108 which engages a protruding portion 109 of the fitting 106. A recess 111 is formed in the inner end of fitting 106, deep enough to partially receive an O-ring 112 which sealingly encircles rod 105 while allowing the rod to slide relative thereto. The O-ring 112, with fitting 106 screwed into its normal position, bears against a transverse wall 113 of the housing 114, and thus forms a seal between members 105, 106 and 113 during axial movement of rod 105. A threaded side outlet opening 115 is provided in the tubular housing 114 for receiving the end fitting 116 or elbow 116' (FIG. 6) by means of which flexible outlet hose 24 is connected to the housing 114. A portion 117 of the control rod 105 is of reduced diameter and of a length extending from the side of bore 115 which is closest to knob 101 to a piston 118 fixedly mounted on the terminal end of portion 117 of rod 105. Piston 118 is formed with a recess 119 for firmly holding an O-ring 121 which has an inner diameter encompassing but spaced from rod portion 117 for providing sealing engagement between piston 118 and another transverse wall 122 of the tubular housing 114, and which wall faces toward the piston 118. The bore 120 through wall 122 is of larger diameter than rod portion 117. The piston 118 does not fit snugly within the inner diameter of housing 114, but is spaced therefrom, thus providing a piston chamber 123 for flow of liquid around the piston 118, into bore 120 and out through opening 116 when the valve is open. The piston 118 has a portion 124 of reduced diameter on which a rust-proof compression spring 125 is mounted. An end collar 126 having a hollow bore 127 fits within the helical spring 125 and abuts against an inlet fitting 128 by means of which tube 23 from tank 14 is connected to the valve housing 114. The spring 125 is thus compressed between the collar 126 and piston 118 to urge the piston 118 and its O-ring 121 toward the right (as viewed in FIG. 5) against the transverse wall 122, to maintain a seal when the valve is closed. Piston 118 has a flat end face 129 within the spring 125 and facing in the direction from which liquid pressure enters through tube 23. Only a very minute portion of the O-ring 121 protrudes out of piston 118 away from face 129 and toward the wall 122, so that when the valve is in closed position and the pressure from tank 114 is transmitted to chamber 123 through tubing 23, the end face 129, and the portion of piston 118 on which spring 125 rests axially, both provide piston surfaces on which the pressure in chamber 123 acts to produce an axial force predominatly toward the right (as viewed in FIG. 5), supplementing spring 123 and tending to force piston 118 and its O-ring 121 against wall 122, thus improving the sealing action within the valve 100.

As best seen in FIG. 6, the nozzle 10 is made with an angular slit adapted to direct the spray mist across a vertical angle α encompassing more than the vertical extent of the area traversed by the wiper blades. The slit is formed in the nozzles with two intersecting planes at an angle α to each other (FIG. 6) and meeting in a horizontal line, intersected at its center by the central vertical bore 38, so that, as shown in FIG. 1, the horizontal range of the spray mist also encompasses or subtends more of the windshield than merely the area traversed by the wiper blades 13.

The apparatus operates as follows. The tank 14 is filled with water or glass cleaning liquid through fitting 19 up to the overflow point, level with surface 28. The cap 25 or 25' is screwed in tightly but with merely manual force, which is sufficient to close the pressure-tight seal formed by the O-ring 26 between the surface 28 and its groove in cap 25. Air is then added from a compressed-air line at any gas station until the pressure is about 70 p.s.i. The tank and fittings are preferably durably built and pre-tested to carry pressures many times this value, so as to preclude any danger of leaks or bursting. To clean the windshield, manual pressure is applied to the knob 101 for as long a period or as often as desired, with or without reciprocation of the wiper blades.

The relatively high air pressure in space 36 forces the liquid through the special nozzles 10 over the entire windshield area. With usually only one swipe of the wiper blade 13, the area traversed by the blade becomes immediately clear and clean. This is in marked contrast to the results achieved with the spotty or squirting type of sprinkle produced by prior-art devices operating at lower pressures, which require many swipes of the wiper blade to spread any supplied liquid which has not been wasted or swept away, and which often leaves a sloppy, streaky windshield. The apparatus of the invention is easily installed, it increases the driver's safety and convenience, and one filling with air and water is normally sufficient for more than 500 spray applications.

It will be obvious to those skilled in the art, upon studying this disclosure, that devices according to the present invention can be modified in various respects and hence may be embodied in devices other than as particularly illustrated and described herein, without departing from the essential features of the invention and within the scope of the claims annexed hereto.

We claim:

1. In a device for spraying a cleaning liquid under pressure onto a vehicle windshield traversed by a windshield wiper, nozzle means adapted to be fixed to the forward hood of the vehicle and having an outlet shaped for distributing droplets of said liquid over an area greater than the area traversed by said wiper, a tank for containing liquid under pressure, said tank being provided with liquid-inlet means having a socket portion and a seal-engaging surface, said inlet means being shaped and positioned for limiting the quantity of liquid in said tank to a level below the top of the tank, safety closure means for closing off said inlet means comprising a cap portion and a hollow stem portion, a resilient member carried by said cap portion and sealingly engageable with said inlet means surface when said closure means is in closed condition, said stem portion being provided with a side passage through the stem portion wall disposed so as to be within said socket portion when said closure means are in said closed condition, mutual coupling means on said stem and socket portions for resisting axial thrust tending to dislodge said stem portion from said socket portion, said coupling means being partially disengageable to allow the stem portion containing said side passage to extend out of said socket portion beyond said surface for exhausting pressure from said tank, whereby said hollow stem portion and side passage form a pressure-relieving outlet for the tank while said stem portion is being disengaged from said socket portion but before said coupling means are completely disengaged, and a push-button operated control valve connected between said source and said nozzle means for controlling the frequency and duration of spray applications of said cleaning liquid issuing from said nozzle means.

2. In a device for spraying a cleaning liquid under pressure onto a vehicle windshield traversed by a windshield wiper, nozzle means adapted to be fixed to the forward hood of the vehicle and having an angular slit defining two surfaces lying in respective mutually intersecting planes and at an angle to each other such as to subtend at least the entire windshield area traversed by said wiper, a pressure-tight tank for supplying the liquid, said tank being provided with liquid-inlet means having a socket portion and a seal-engaging surface, said inlet means being shaped and positioned for limiting the quantity of liquid in said tank to a level below the top of the tank, safety closure means for closing off said inlet means comprising a cap portion and a hollow stem portion, a resilient member carried by said cap portion and sealingly engageable with said inlet means surface when said closure means is in closed condition, said stem portion being provided with a side passage through the stem portion wall disposed so as to be within said socket portion when said closure means are in said closed conditions, mutual coupling means on said stem and socket portions for resisting axial thrust tending to dislodge said stem portion from said socket portion, said coupling means being partially disengageable to allow the stem portion containing said side passage to extend out of said socket portion beyond said surface for exhausting pressure from said tank, whereby said hollow stem portion and side passage form a pressure relieving outlet for the tank while said stem portion is being disengaged from said socket portion but before said coupling means are completely disengaged, means for introducing compressed air into said tank, a control valve adapted to be fixed to the instrument panel of said vehicle and comprising a valve housing and a control rod axially movable therein, said contral rod having a piston fixedly attached thereto for axial simultaneous movement therewith, means providing an inlet in one axial end of said valve housing and connected to said tank for receiving said liquid under pressure therefrom, means intermediate the axial ends of said valve housing providing an outlet for liquid therefrom and connected to said nozzle means, biasing means urging said control rod away from said one axial end, a transverse wall in said housing defining an opening for passage of liquid around the portion of said rod adjacent said piston, said piston being provided with O-ring means surrounding said rod portion for sealing said wall opening when said piston is located against said wall, and a piston surface facing toward said one axial end of said housing for receiving pressure from said liquid to urge said piston into sealing contact with said transverse wall.

3. In a device for spraying a cleaning liquid under pressure onto a vehicle windshield traversed by a windshield wiper, nozzle means having an outlet shaped for distributing droplets of said liquid over an area greater than the area traversed by said wiper, a source of liquid under pressure, a control valve connected between said source and said nozzle means for controlling the frequency and duration of the spray applications of said liquid issuing from said nozzle means, said liquid source comprising a tank provided with liquid-inlet means having a socket portion and a seal-engaging surface, said inlet means being shaped and positioned for limiting the quantity of liquid in said tank to a level below the top of the tank, safety closure means for closing off said inlet means comprising a cap portion and a hollow stem portion, a resilient member carried by said cap portion and sealingly engageable with said inlet means surface when said closure is in closed condition, said stem portion being provided with a side passage through the stem portion wall disposed so as to be within said socket portion when said closure means are in said closed condition, mutual coupling means on said stem and socket portions for resisting axial thrust tending to dislodge said stem portion from said socket portion, said coupling means partially disengageable to allow the stem portion containing said side passage to extend out of said socket portion beyond said surface for exhausting pressure from said tank so that said hollow stem portion and side passage form a pressure-relieving outlet for the tank while said stem portion is being disengaged from said socket portion but before said coupling means are completely disengaged, said control valve comprising a valve housing, a control rod axially movable therein, means providing an inlet in one axial end of said valve housing and connected to said source for receiving liquid therefrom, means intermediate the axial ends of said housing providing an outlet for liquid therefrom and connected to said nozzle means, a piston fixed to one end of said rod and having an outer periphery spaced from the inner surface of said housing, a transverse wall in said housing adjacent said piston and defining an opening for passage of fluid, when said piston is spaced away from said wall, from around said piston and through said outlet, said piston being provided with sealing means facing said wall for forming a seal thereagainst around said wall opening when said piston is urged against said wall, and a piston surface facing toward said one axial end of said housing for receiving pressure from said source to urge said piston against said wall.

References Cited in the file of this patent
UNITED STATES PATENTS

| | | |
|---|---|---|
| 1,568,159 | Heywood | Jan. 5, 1926 |
| 1,993,534 | Stoltz | Mar. 5, 1935 |
| 2,285,655 | Heinemann | June 9, 1942 |
| 2,306,778 | Carney | Dec. 29, 1942 |
| 2,626,184 | Caldwell | Jan. 20, 1953 |